Jan. 28, 1969   H. B. MILLER ET AL   3,424,857
GROMMET

Filed June 6, 1967   Sheet 1 of 2

INVENTORS
HUBERT B. MILLER
KENNETH W. KIPP

BY Jeffers and Young
ATTORNEYS

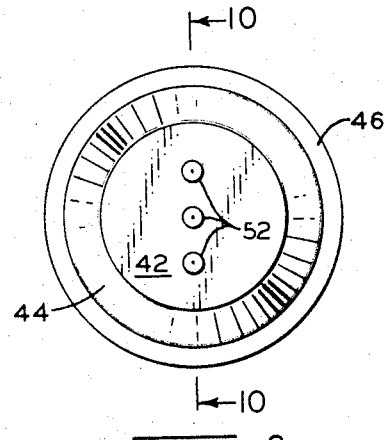
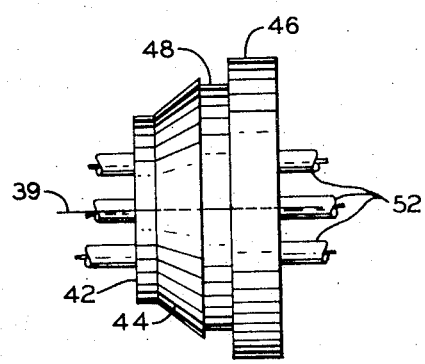
FIG. 8　　FIG. 9
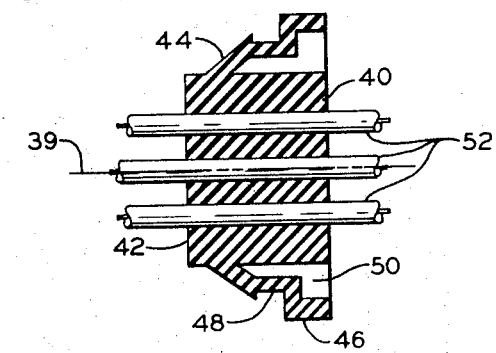
FIG. 10
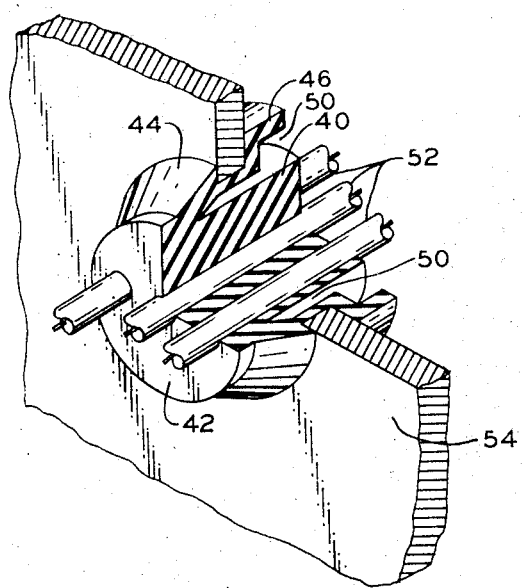
FIG. 11
INVENTORS
HUBERT B. MILLER
KENNETH W. KIPP
BY  *Jeffers and Young*
ATTORNEYS

United States Patent Office 3,424,857
Patented Jan. 28, 1969

3,424,857
GROMMET
Hubert B. Miller, Wolcottville, and Kenneth W. Kipp, Goshen, Ind., assignors to Lyall Electric, Inc., Albion, Ind., a corporation of Indiana
Filed June 6, 1967, Ser. No. 643,908
U.S. Cl. 174—153                10 Claims
Int. Cl. H01b *17/26*

ABSTRACT OF THE DISCLOSURE

A circular grommet is provided with an internal, cylindrical groove near its outer periphery that permits the grommet to be collapsed and more easily inserted in a circular panel hole. After being inserted, the grommet can spring back to its original shape and is firmly held in the panel hole by a circular groove around the outer periphery of the grommet.

Background of the invention

Our invention relates to an improved grommet, and particularly to an improved grommet which can be easily collapsed and inserted in a panel hole, after which the grommet springs back to its original shape and is firmly held in the panel hole.

Grommets are used to protect electrical wires and other devices from being cut or damaged when they are passed through and are positioned in a hole in a panel. Some grommets have a relatively large internal opening which permits the grommet to be easily collapsed and placed in position in the panel hole, after which the wires or other devices are passed through the grommet. But because of the relatively large size of the internal grommet opening, there is empty space around the electrical wires or devices in the grommet hole. In some apparatus, as for example refrigerators, this space permits the transfer of heat, moisture, or vapor which detracts significantly from the efficiency of the refrigerator. In order to close this empty space, manufactures have made grommets which are molded around the wires or other device which pass through the grommet in the panel hole so that there is no empty space through which heat, moisture, or vapor can pass. While such grommets provide an adequate heat, moisture, and vapor barrier or seal, they are difficult to insert or place in the panel hole. The relatively solid construction of such grommets prevents them from being easily collapsed in order that they can be inserted in the panel hole. Thus, manufacturers must choose between: a grommet which has a large opening and which can be easily collapsed for insertion in the panel hole but which permits heat, moisture, or vapor to pass through the grommet space; or a solid barrier type of grommet which prevents heat, moisture, or vapor from passing through the grommet opening but which is relatively difficult to insert in the panel hole; or a grommet that possesses both these desirable attributes but which is too long to conveniently fit in the space available due to the relatively thin wall construction popular among refrigerator and freezer manufacturers.

Accordingly, an object of our invention is to provide an improved grommet which combines the advantages of an easily inserted grommet and the advantages of a grommet with good retention characteristics.

Another object of our invention is to provide an improved grommet which permits the wires or other devices to be cemented or integrally molded (as compared to so-called bunch molded) in the grommet to form a barrier, but which can be easily collapsed for insertion into a panel hole.

Another object of our invention is to provide an improved grommet construction that has the advantages of a solid barrier type of grommet as well as the advantages of an easily collapsed and inserted grommet.

Another object of our invention is to provide an improved grommet that is easily collapsed for insertion, and that either permits the wires or other devices to be molded therein in one piece with the grommet to form a closed barrier, or that permits the wires to be passed through and cemented into the grommet to form a closed barrier.

Another object of our invention is to provide an improved grommet that insures bonding or cementing completely around the periphery of each wire in the grommet.

Another object of our invention is to provide an improved grommet that provides a heat, vapor, or moisture seal between the grommet and the wire.

Another object of our invention is to provide an improved grommet that provides a heat, vapor, or moisture seal between the grommet and the mounting panel.

Summary of the invention

Briefly, these and other objects are achieved in accordance with our invention by a resilient grommet which is tapered and which has an internal circular groove that forms a space or volume which permits the outer walls of the grommet to be relatively easily collapsed. Wires or other devices pass through the interior of the grommet which forms a solid wall or barrier so that heat, moisture, or vapor cannot pass through or around the grommet. In one embodiment of our invention, the wires may be molded with the grommet to form an integral construction. In another embodiment of our invention, the wires can pass through holes or openings in the grommet, after which a suitable cement is placed around the wires to firmly hold the wires and form a solid barrier or shield. In another embodiment of our invention, the wires can be inserted through holes in the grommet. These holes are of a smaller diameter than that of the wire so that the grommet grips the inserted wire with enough force to form a solid barrier or shield. In all embodiments, the circular groove permits the grommet to be collapsed, and its tapered end easily inserted in a panel hole. After insertion, the grommet springs back to its original shape to be held in the panel hole by an outer groove which engages the edges of the panel hole.

Brief description of the drawing

The subject matter which we regard as our invention is particularly pointed out and distinctly claimed in the claims. The structure and operation of our invention, together with further objects and advantages, may be better understood from the following description given in connection with the accompanying drawings, in which:

FIGURE 8 shows a front end view of another embodiment of our grommet which is integrally molded with three wires;

FIGURE 9 shows a side elevation view of the grommet of FIGURE 8;

FIGURE 10 shows a cross-sectional view taken along the lines 10—10 of FIGURE 8; and FIGURE 11 shows a perspective view, with portions broken away, of the grommet of FIGURES 8, 9, and 10 inserted in a panel.

*Description of the preferred embodiments*

Figure 1:
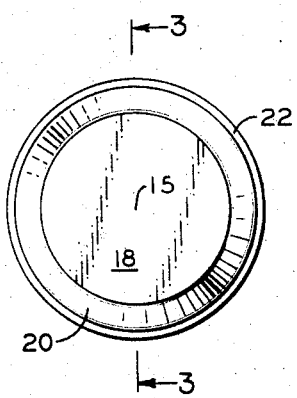
FIGURE 1 shows a front end view of one embodiment of our grommet in which the wires or other devices are held by cement.
Figure 2:
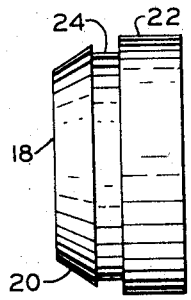
FIGURE 2 shows a side elevation view of the grommet of FIGURE 1.
Figure 3:
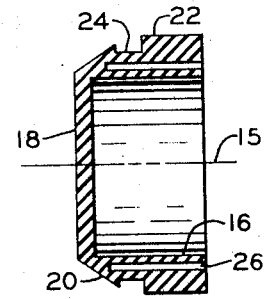
FIGURE 3 shows a cross-sectional view taken along the lines 3—3 of FIGURE 1.

FIGURES 1, 2, and 3 show front end, side elevation, and cross-sectional views respectively of our grommet provided with a wire holding portion that is adapted to receive an adhesive or cement for holding wires. This grommet has a body of circular configuration that is concentric about a longitudinal axis 15. The grommet may be formed of any suitable material that preferably has the qualities of being resilient and electrically insulating. A typical material is a moldable rubber or synthetic rubber. The grommet comprises a hollow, thin walled, cylindrical wire holder 16. A circular front 18 extends acrosst the front end of the wire holder 16. A front flange 20 extends from the front 18 toward the rear end of the wire holder 16, and tapers outwardly in a conical fashion. A rear flange 22 extends from the vicinity of the front flange 20 toward the rear end of the wire holder 16. The rear flange 22 is, as shown particularly well in FIGURE 3, generally cylindrical in shape. A holding groove 24 is formed by the rear flange 22 and the front flange 20 to provide a heat, moisture, or vapor seal. The holding groove 24 encircles grommet, and preferably has a generally rectangular cross-section for fitting the edges or surfaces of a panel hole. However, the cross-section may be curved or angular if desired. The diameter of the holding groove 24 should be approximately equal to the diameter of the panel hole. A cylindrical collapsing groove or space 26 is provided between the wire holder 16 and the rear flange 22, and between the wire holder 16 and the portion of the front flange 20. This groove or space 26 is provided to permit the grommet to be collapsed and more easily inserted in a hole or opening in a panel without detracting from the retention ability of the grommet. The wire holder 16 and the front 18 form a cylindrical space or volume which, as will be explained in connection with FIGURES 4, 5, 6, and 7, provides a location for holding electrical wires.

Figure 4:
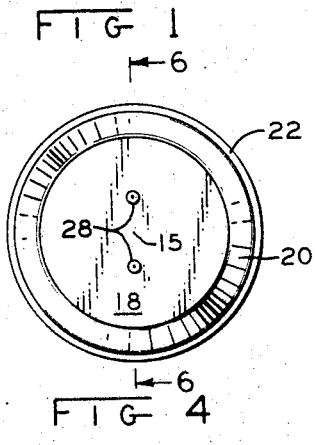
FIGURE 4 shows a front end view of the grommet of FIGURE 1 with two wires passing therethrough.
Figure 5:
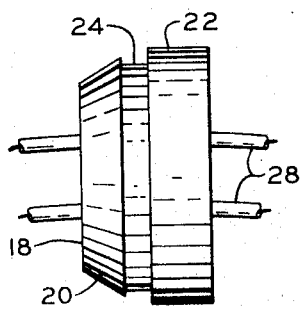
FIGURE 5 shows a side elevation view of the grommet of FIGURE 4.
Figure 7:
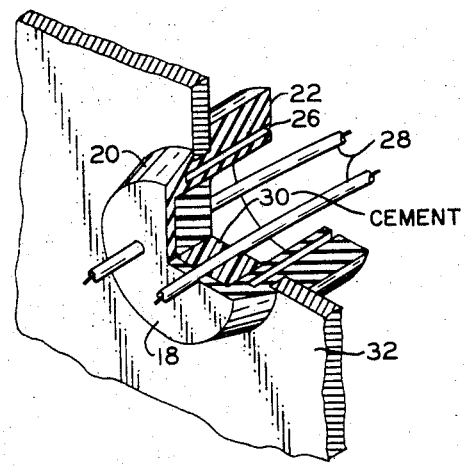
FIGURE 7 shows a perspective view, with portions broken away, of the grommet of FIGURES 4, 5, and 6 inserted in a panel.
Figure 6:
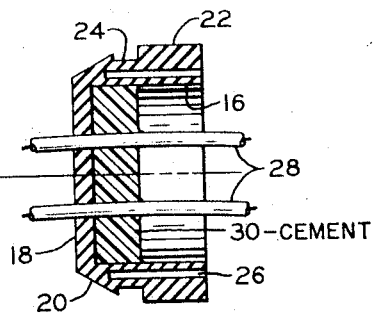
FIGURE 6 shows a cross-sectional view taken along the lines 6—6 of FIGURE 4.

FIGURES 4, 5, and 6 show front end, side elevation, and cross-sectional views respectively of the grommet of FIGURES 1, 2, and 3 with two electrical wires 28 inserted therethrough, and held in place by a suitable adhesive or cement 30. A suitable material is a thermosetting plastic such as an epoxy compound. More or less wires may also be accommodated. As shown particularly well in FIGURE 6, the wires 28 may be inserted through the front 18, which is relatively thin, by merely pushing them through small punctures or pre-punched holes in the resilient material of the grommet. After the wires 28 are in the desired position, they may then be held in the grommet by the addition of the adhesive or cement material 30. After this cement material has set or hardened, the wires 28 are firmly and individually held around their circumference in an insulating relation in the grommet. FIGURE 7 shows the grommet inserted in a panel 32 having a circular hole or opening which is of the proper size to accommodate the holding groove 24. The grommet with its cemented wires 28 may be collapsed by pressing inwardly on the rear flange 22 and forcing the front 18 and tapered front flange 20 through the opening in the panel 32. The front flange 20 collapses into the space or volume provided by the collapsing space 26. Once the front flange 20 has passed through the panel 32, its surfaces snap or spring back outwardly to their original position. With the surfaces of the first flange 20 back in their original position, the grommet is firmly held by the edges or surfaces of the panel hole being positioned in the holding groove 24 between the front flange 20 and the rear flange 22. Although the grommet is easily collapsed and inserted into the panel hole or opening because of the collapsing space 26 provided by our grommet construction, we have found that the flanges, particularly the front flange 20, spring back into their original position and firmly hold the grommet in the panel 32. The front 18 as well as the cement or adhesive material 30 form a good barrier which prevents heat, moisture, or vapor from passing through the grommet, and which also provides good support and electrical insulation for the wires 28. The relatively short length of the grommet enables the wires to be bent or turned at a sharp angle close to the panel face containing the grommet. This is particularly desirable in the thin wall construction of refrigerators and freezers. The grommet may also be inserted in the panel first, and the wires then positioned and cemented in place.

FIGURES 8, 9, and 10 show front end, side elevation, and cross-sectional views respectively of another embodiment of our grommet. The grommet of FIGURES 8, 9, and 10 is similar to the grommet of FIGURES 1 through 7, but the wire holder is solid rather than hollow, and is integrally formed with and of the same resilient material as the remainder of the grommet. This grommet has a body that is also generally circular and concentrically positioned about a longitudinal axis 39. The grommet comprises a cylindrically shaped wire holder 40, which is integral with the rest of the grommet and solid except for the wires passing therethrough. A front flange 44 extends from the grommet front 42 toward the rear, and tapers outwardly in conical fashion. A cylindrical rear flange 46 extends toward the rear from the vicinity of the front flange 44 and a holding groove 48 is formed between or by the two flanges 44, 46. A collapsing space or groove 50 is formed between the wire holder 40 and the rear flange 46, and preferably a portion of the front flange 44. The collapsing groove 50 is tapered toward the front of the grommet and stepped or enlarged outward toward the rear of the grommet. The grommet shown in FIGURES 8, 9, and 10 is preferably formed with wires 52 (three are shown as an example) integrally formed or molded with the grommet when it is constructed. With the grommet and its wires 52 so formed, it may be inserted in a hole or opening in a panel 54 as shown in FIGURE 11. The grommet is inserted by collapsing the front flange 44 into the collapsing groove or space 50, and forcing the front 42 through the hole or opening in the panel 54. After the front flange 44 passes through the panel hole, it snaps or springs outwardly back to its original position to lock the grommet in the panel 54 with the edges of the panel in the holding groove 48. Thus, the grommet is easily inserted into a panel hole or opening by collapsing its flanges into the collapsing groove or space 50, after which it springs back into shape and is firmly held in place. It will be seen that our grommet provides a good barrier against heat, moisture, or vapor because of the solid construction of the wire holder 40 and the sealing characteristics of the holding groove 48 and the back flange 46.

It will thus be seen that our new and improved grommet provides a construction which provides a good heat, moisture, or vapor seal or barrier, but at the same time permits the grommet to be easily inserted in a panel hole or opening. After being inserted, the grommet firmly holds the electrical wires or other devices in position and in insulated relation. Our grommet permits each wire to be cemented or molded around its full circumference so as to be held more firmly and provide a better barrier or seal. Persons skilled in the art will appreciate that modifications may be made to our invention. For example, while we prefer that the flanges and grooves, particularly the collapsing grooves, have the configurations shown, other configurations may be used and still permit the grommet to be collapsed and easily inserted. Likewise, various materials may be used to form the grommet, or to provide the cement or adhesive. Our grommet may be constructed in various shapes to permit mounting in irregular shaped panel openings. Such shapes include, by way of example, D-shaped openings, oblong openings, and rectangular openings. It will be appreciated that tabs or lugs as well as pockets or voids of various configurations may be made a part of the holding groove to prevent the grommet from turning about its axis after the grommet has been mounted in a panel. Therefore, while our invention has been described with reference to particular embodiments, it is to be understood that modifications may be made without departing from the spirit of the invention or from the scope of the claims.

What we claim as new and desire to secure by Letters Patent of the United States is:

1. An improved grommet comprising:
   (a) a body of resilient material, said body having an internal groove extending longitudinally from the rear toward the front and extending therearound near the outer periphery thereof, and having an external holding groove extending completely around the outer periphery thereof to engage the edges of a panel opening;
   (b) and means forming a closed barrier across said grommet to hold wires and the like and to seal said grommet against the passage of heat, moisture, and vapor therethrough.

2. The grommet of claim 1 wherein said internal groove has a substantially cylindrical configuration, and wherein said body comprises a front that forms a barrier across said internal groove.

3. An improved circular grommet of resilient material for holding electrical wires and the like in a panel opening comprising:
   (a) a front portion;
   (b) a rear portion;
   (c) a front flange encircling said grommet, said front flange having an outer surface that tapers outwardly from said front portion and extends toward said rear portion;
   (d) a rear flange encircling said grommet, said rear flange having an outer surface of substantially constant diameter that extends from said rear portion toward said front portion;
   (e) said front and rear flanges forming a holding groove therebetween that encircles said grommet and that has a cross-section and diameter for fitting in a circular opening in a panel;
   (f) and a cylindrically shaped wire holding portion internally positioned in said grommet, at least a portion of said wire holding portion having its outer surface spaced from said flanges to form a cylindrical space therebetween that permits said grommet to be collapsed and inserted in said panel opening.

4. The improved grommet of claim 3 wherein the interior of said wire holding portion comprises a solid construction of resilient material.

5. The improved grommet of claim 3 wherein at least one wire passes through said grommet and a portion of the interior of said wire holding portion comprises an added adhesive material.

6. An improved grommet for holding electrical wires and the like in a panel hole comprising:
   (a) a cylindrically shaped wire holder having front and rear ends and being concentrically positioned along a longitudinal axis;
   (b) a circular front concentrically positioned about said longitudinal axis at said front end of said wire holder;
   (c) a front flange concentrically positioned about said longitudinal axis, said front flange having an outer surface that tapers outwardly from said front and extends toward said rear end;
   (d) a rear flange concentrically positioned about said longitudinal axis, said rear flange having an outer surface of substantially constant diameter that extends from the vicinity of said front flange toward said rear flange;
   (e) said flanges having interior surfaces that are spaced from said wire holder to form a space that permits said grommet to be collapsed and inserted in a panel opening;
   (f) and said front and rear flanges forming an outer circular holding groove therebetween for mating with said panel hole and forming a heat, moisture, and vapor seal.

7. The improved grommet of claim 6 wherein said wire holder comprises a structure of resilient material that is adapted to surround at least one wire and that is integral with the remainder of said grommet.

8. The improved grommet of claim 7 wherein said resilient material completely encompasses the outer periphery of each wire therein for the entire length of said wire holder.

9. The improved grommet of claim 6 wherein a portion of said wire holder has a cylindrical space for receiving an adhesive material for holding at least one wire therein.

10. The grommet of claim 9 wherein at least one wire passes through said grommet and said wire holder comprises adhesive material that completely encompasses the outer periphery of each wire therein for the entire length of said wire holder.

References Cited

UNITED STATES PATENTS

| | | | |
|---|---|---|---|
| 892,626 | 7/1908 | Selinger | 174—167 X |
| 2,912,712 | 11/1959 | Shamban et al. | 16—2 |

FOREIGN PATENTS

| | | |
|---|---|---|
| 623,471 | 2/1963 | Belgium. |
| 262,532 | 12/1926 | Great Britain. |
| 823,722 | 11/1959 | Great Britain. |

LARAMIE E. ASKIN, *Primary Examiner.*

U.S. Cl. X.R.

16—2; 277—178